United States Patent [19]

Kamisango et al.

[11] Patent Number: 5,692,141
[45] Date of Patent: Nov. 25, 1997

[54] GROUPWARE SYSTEM PROVIDING FACILITATED DATA TRANSFER AMONG COMMON AND INDIVIDUAL WORK AREAS

[75] Inventors: Maki Kamisango; Hiroshi Katsurabayashi, both of Kanagawa, Japan

[73] Assignee: Fuji Xerox Co., Ltd., Tokyo, Japan

[21] Appl. No.: 416,250

[22] Filed: Apr. 4, 1995

Related U.S. Application Data

[63] Continuation of Ser. No. 903,678, Jun. 24, 1992, abandoned.

[30] Foreign Application Priority Data

Jun. 25, 1991 [JP] Japan .................. 3-178870

[51] Int. Cl.⁶ ............................................... G06F 13/00
[52] U.S. Cl. ............... 395/329; 395/331; 395/971; 395/608; 395/617; 395/712; 395/200.08
[58] Field of Search ................... 395/600, 200.03, 395/200.08, 200.09, 200.15, 329, 331, 608, 617, 712; 379/58; 455/39, 53.1, 54.1

[56] References Cited

U.S. PATENT DOCUMENTS

| | | | |
|---|---|---|---|
| 4,587,630 | 5/1986 | Straton et al. | 340/706 |
| 4,718,005 | 1/1988 | Feigenbaum et al. | 395/200 |
| 4,754,395 | 6/1988 | Weisshaar et al. | 395/650 |
| 4,830,477 | 5/1989 | Miyatake et al. | 340/747 |
| 4,835,685 | 5/1989 | Kun | 395/650 |
| 4,941,084 | 7/1990 | Terada et al. | 395/650 |
| 5,001,572 | 3/1991 | Hashimoto et al. | 358/440 |
| 5,046,001 | 9/1991 | Barker et al. | 395/275 |
| 5,144,548 | 9/1992 | Salandro | 364/138 |
| 5,157,763 | 10/1992 | Peters et al. | 395/157 |
| 5,261,052 | 11/1993 | Shimamoto et al. | 395/200 |
| 5,282,273 | 1/1994 | Ushio et al. | 395/325 |
| 5,436,960 | 7/1995 | Campana et al. | 379/58 |
| 5,548,814 | 8/1996 | Lorang et al. | 455/38.1 |
| 5,551,035 | 8/1996 | Arnold et al. | 395/650 |

FOREIGN PATENT DOCUMENTS 2-197946  8/1990  Japan .

*Primary Examiner*—Wayne Amsbury
*Assistant Examiner*—Hosain T. Alam
*Attorney, Agent, or Firm*—Finnegan, Henderson, Farabow, Garrett & Dunner, L.L.P.

[57] ABSTRACT

A groupware system in which, by specifying a destination by means of simple data transmission destination information, an individual person is able to rewrite data in a common work space and an operator is able to transmit and receive data between work stations with ease. The system comprises an input/output management device for controlling input from and output to an operator, a communication control device, a transmission destination management table for indicating correspondence between a simple expression style of information to specify a transmission destination and the address information of the transmission destination, a data transmission destination decision device for referring to the transmission destination management table to find the address information of the transmission destination from the transmission destination specification information input through the input/output management device, a communication data creating device for creating communication data, a communication data analysis device for identifying and separating the content of the communication data from the address information, a transfer destination management table for managing permission or prohibition of transfer of data to the respective pieces of application software in the groupware system, and a data transmission destination decision device for referring to the transfer destination management table to decide the application software of the transfer destination.

6 Claims, 5 Drawing Sheets

FIG. 2

TRANSMISSION DESTINATION MANAGEMENT TABLE

| $x_0$ | $x_1$ | $y_0$ | $y_1$ | TRANSMISSION DESTINATION |
|---|---|---|---|---|
| 0 | 100 | 0 | 100 | WORK STATION 3 |
| 0 | 100 | 100 | 200 | WORK STATION 3<br>WORK STATION 4 |
| | | | | |

FIG. 3

TRANSFER DESTINATION MANAGEMENT TABLE

| APPLN. | TRANSFER PERMISSION FLAG |
|---|---|
| APPLN. 1 | OK |
| APPLN. 2 | NO |
| APPLN. 3 | OK |
| | |

5,692,141

GROUPWARE SYSTEM PROVIDING FACILITATED DATA TRANSFER AMONG COMMON AND INDIVIDUAL WORK AREAS

This application is a continuation of application Ser. No. 07/903,678, filed Jun. 24, 1992 now abandoned.

BACKGROUND OF THE INVENTION

1. Field of the Invention

The present invention relates to a groupware system in which a plurality of information processing devices are connected to a network so that a plurality of operators are able to perform a cooperative operation by using these information processing devices.

2. Description of the Related Art

As a conventional groupware system, as disclosed in Published Unexamined Japanese Patent Application No. 197946/1990, there is proposed a system in which data are shared in common between a plurality of work stations on a Local Area Network (LAN) and, in the common work space, there is formed a private area which is a work space for an individual operation. In this conventional operation system, if a user (an operator), when having an access right, presents a request to specify an area within the common work space to set up a private area, then the private area can be set up within the common work space. Once the private area is set up, then visual access to the private area, change of the state of the private area and the like by other users are limited. The limit comprises several stages which correspond to the predetermined levels of privacy. Therefore, a user who is limited on the visual access cannot access the private area.

In the above-mentioned conventional operation system, data in the common work space cannot be easily copied or moved to the individual operation work station or private work station, and data cannot be easily transferred to other users through the common space.

SUMMARY OF THE INVENTION

In view of this, the present invention is accomplished to eliminate the drawbacks accompanying the above conventional groupware system. Accordingly, it is an object of the invention to provide a groupware system which, by specifying a destination with a simple bit of data transmission destination information, allows an individual to rewrite data in a common work space and also allows an operator to transmit and receive data between work stations with ease.

In attaining the above object, according to the invention, as shown in FIG. 1, there is provided a groupware system which comprises: input/output management means for managing a display output to an operator and an input from the operator, communication control means for controlling a procedure for communication with other operative operation systems connected to a network, transmission data storage means for storing input data to be transmitted, a transmission destination management table for corresponding transmission destination specification information to specify a transmission destination in a simple style of expression to address information on said transmission destination, data transmission destination decision means for, from the transmission destination specification information input in the simple style of expression through said input/output management means, referring to the transmission destination management table to find the address information on the transmission destination, communication data creation means for treating communication data from the transmission destination address information obtained by the data transmission destination means and the content data to be transmitted that is stored in said transmission data storage means, communication data analysis means for analyzing the communication data input therein and for identifying and separating the content data and address information of said communication data from each other, communication data storage means for storing the content data identified and separated by said communication data analysis means, a transfer destination management table for managing whether data can be transferred or not to the respective pieces of application software in an application software group operable in the groupware system, and data transfer destination decision means for referring to the transfer destination management table from the address information identified and separated by the communication data analysis means to decide the application software of a transfer destination.

According to the invention, an operator inputs transmission data and transmission destination information by means of input/output management means. The transmission destination information is input in a simple style of expression. For example, the input/output management means includes display means and position specifying means, whereby a given area for the transmission destination specification is displayed in the display means and an operator specifies a given area that corresponds to the transmission destination by means of the position specifying means (such as a mouse). The input/output identifies, as the transmission destination information, the specification position (which is represented by a coordinate value, for example) of the specified given area. The transmission destination information is converted into the address of the transmission destination by data transmission destination decision means. For this conversion, there is used transmission destination management table which manages the position information of an area corresponding to the data transmission destination as the data transmission destination information. The transmission destination management table, for example, as shown in FIG. 2, is arranged such that the coordinates of the opposing vertexes of a rectangular area displayed as the given area by the display means are made to correspond to the address information of the transmission destination. Also, in order to be able to specify a plurality of data transmission destinations simultaneously, there may be prepared a transmission destination management table in which two or more pieces of transmission destination address information correspond to one piece of the above-mentioned transmission destination specification information.

The transmission data input is stored in transmission data storage means. In order to transmit the transmission data to the address of the data transmission destination decided by the data transmission destination decision means, the transmission data is converted into data for communication by communication data creating means and is then communicated in the control of communication control means.

Then, on the receiving side, the communication data received is analyzed by communication data analysis means so that the content and transmission destination information of the received communication data are discriminated from each other. The content of the received data taken out is once stored in received data storage means. The destination of the content of the received data stored is determined according to the decision of data transfer destination decision means. For the decision of the data transfer destination, as shown in FIG. 3, there is used a transfer destination management table arranged in such a manner that a transfer permission flag indicating permission or rejection of transfer of the received data is made to correspond to the respective applications. And the input/output management means outputs the received data content to a window of the application for which data transfer is permitted or to a process program.

According to the invention, as described above, due to the fact that the transmission destination management table for managing the data transmission destination information and the position information on an area corresponding to the transmission destination is used to specify the communication destination between the groupware systems (work stations) by means of specification of the area position information, that is, by means of the transmission destination information in a simple style of expression, an operator is able to specify the data transmission destination in a simple operation and thus the data can be transmitted and received between the groupware systems with ease.

Also, the present invention includes a transmission destination management table which is used to determine the transmission destination and, by rewriting the table, is able to have flexibility in changing the transmission destination. Also, by using a transmission destination management table which can have two or more pieces of data transmission destination information with respect to one area, the invention is able to specify a plurality of data transmission destinations simultaneously.

Further, according to the invention, due to the fact that the data transfer destination is controlled according to a transfer permission flag included in a transfer destination management table, the transfer destination can be changed with flexibility and the data can be transferred to a plurality of transfer destinations simultaneously.

BRIEF DESCRIPTION OF THE DRAWINGS

The accompanying drawings, which are incorporated in and constitute a part of the specification, illustrated presently preferred embodiments of the invention and, together with the general description given above and the detailed description of the preferred embodiments given below, serve to explain the principles of the invention. In the accompanying drawings:

FIG. 2 is a diagram showing an example of a transmission destination management table according to the invention;

FIG. 3 is a diagram showing an example of a transfer destination management table according to the invention;

DESCRIPTION OF THE PREFERRED EMBODIMENTS

Description will hereunder be given in detail of the features of the present invention by way of the embodiments thereof with reference to the accompanying drawings.

Figure 1:
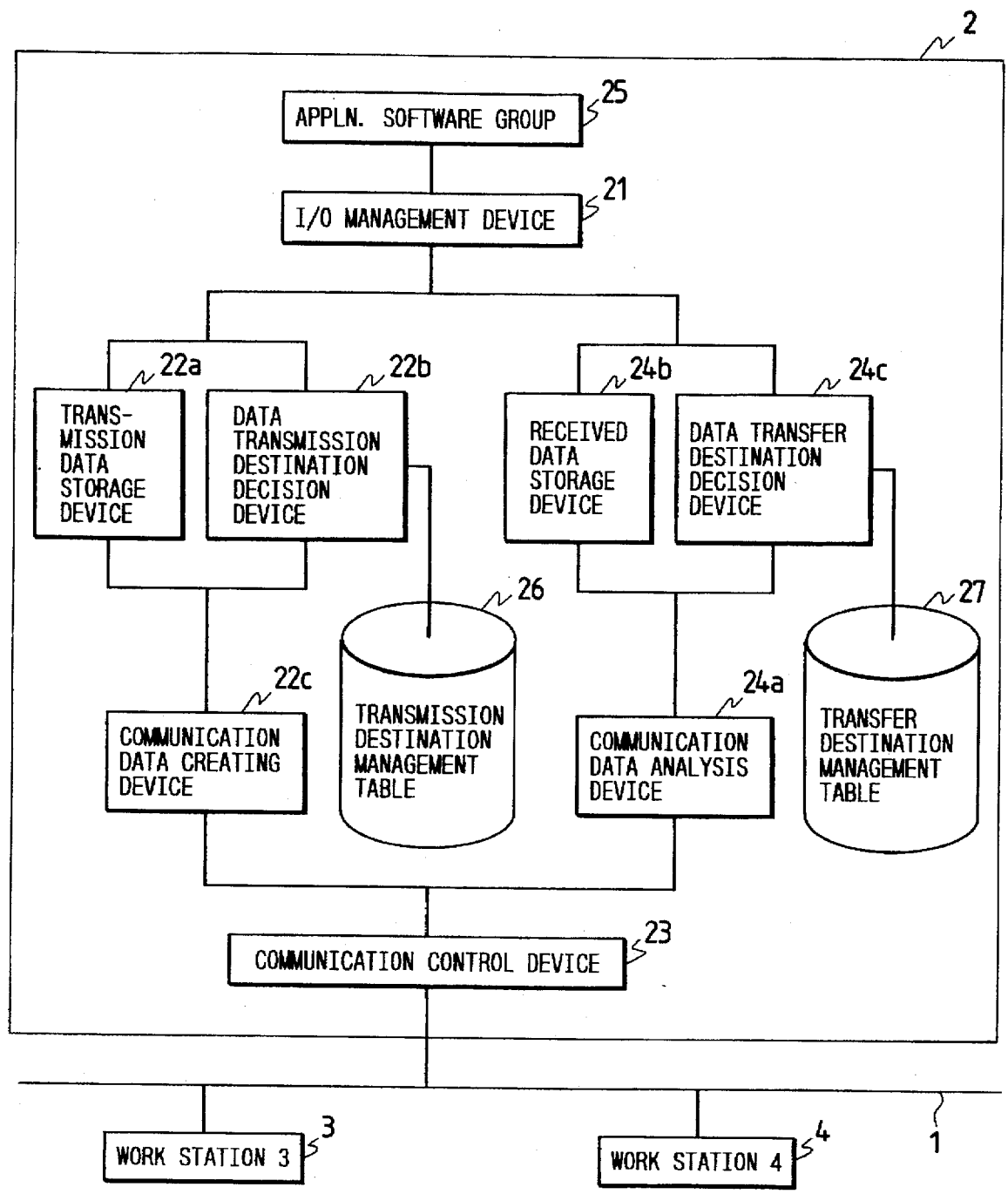
FIG. 1 is a block diagram of the whole structure used to realize a groupware system according to the invention.

Referring now to FIG. 1, there is shown a block diagram of the whole structure for realizing a groupware system according to the invention.

Work stations 2-4, at which operators perform a cooperative operation, are connected to one another through a network 1 and communication is established among the work stations.

The work station 2, which is a groupware system, includes an input/output management device 21 for managing input and output, a communication control device 23 for communicating through the network 1 with the work stations 3, 4 and so on which are respectively other groupware systems, and an application software group 25. Further, in the work station which comprises a groupware system according to the present embodiment, there are included a transmission data storage device 22a which is used to store transmission data input therein, a data transmission destination decision device 22b for deciding a data transmission destination from a simple data transmission destination information input therein, a communication data creating device 22c for adding a necessary header to the stored transmission data to thereby convert it into communication data, a communication data analysis device 24a for analyzing the communication data transmitted from other work stations, a received data storage device 24b for storing the content of the data transmitted, a data transfer destination decision device 24c for deciding to which application software of the application software group 25 the received data is to be transferred, a transmission destination management table 26 for converting the data transmission destination information into data transmission destination address, and a transfer destination management table 27 for managing the permission or prohibition of transfer of the respective pieces of application software of the application software group 25. The work stations 3 and 4 also have the same structure as mentioned above.

At the work station on the transmitting side, an operator is able to input information to be transmitted to the other work stations on the network 1 and a simple piece of data transmission destination information for specifying the transmission destination of the information by means of the input/output management device 21 (a window manager or the like). Here, the transmission data input by the operator is stored in the transmission data storage device 22a. Then, in order that the stored transmission data can be transmitted to a data transmission destination which is decided from a simple piece of data transmission destination information (the name of a work station and the like) by the data transmission destination decision device 22b, the stored transmission data is converted into communication data by the communication data creating device 22c and, after then, the communication data is communicated in the control of the communication control device 23.

On the other hand, at the work station on the receiving side, the communication data received by the communication control device 23 but transmitted from the other work station(s) is analyzed by the communication data analysis device 24a and the information transmitted is stored in the received data storage device 24b. The data transfer destination decision device 24c decides to which application software the information stored in the received data storage device 24b is to be transferred, and indicates the transfer to the input/output management device 21.

Now, description will be given below of the mutual communication between the respective work stations 2-4 with reference to a flow chart shown in FIG. 4.

In the groupware system according to the present embodiment of the invention, if the system is started (Step 101), then the input/output management device 21 always monitors an input from an operator and decides the presence or absence of an input (Step 102).

If an input is present in Step 102, then it is checked whether the input is transmission destination specification data or not (Step 103).

If the input is decided as the transmission destination specification data, then it is checked whether stored data is present or not (Step 104).

If it is decided in Step 104 that no stored data is present, then the operation goes back to Step 102. If it is decided that stored data is present, then a transmission destination is decided by referring to the transmission destination management table 26. (Step 105).

Next, communication data is created by the communication data creating device 22c from the transmission data stored in the transmission data storage device 22a and the transmission destination decided in Step 105, and the thus created communication data is then transferred to the communication control device 23 (Step 106).

Further, the communication control device 23 transmits the data to other work station(s) (step 107).

If the data is decided as not the transmission destination specification data in Step 103, then it is checked whether the input data is the transmission data or not (Step 113). If it is decided as the transmission data, then the transmission data is stored (Step 114) and, if not the transmission data, then the operation goes back to Step 102.

If it is decided in Step 102 that no input is present, then it is checked whether any received data is present or not (Step 108). If no received data is present, then the operation goes back to Step 102.

If it is decided in Step 108) that received data is present, then the received data is analyzed by the received data analysis device 24a (Step 109), and the received data is stored (Step 110).

Next, a transfer destination is decided by referring to the transfer destination management table 27 (Step 111), and the data is transferred to the respective display programs and the like (Step 112).

In FIG. 2, there is shown an example of a transmission destination management table 26 which manages, as data transmission destination information, the position information of an area (a window or the like) corresponding to a data transmission destination. In other words, in the transmission destination management table 26, a rectangular area to be defined by the coordinates $(x_0, y_0)$ of a vertex at the top left-hand corner of the area and the coordinates $(x_1, y_1)$ of a vertex at the bottom right-hand corner of the area is made to correspond to the information of a transmission destination (that is, the name of a transmission destination work station) corresponding to the area.

Due to use of the above-mentioned transmission destination management table 26, only by specifying a corresponding area, the position information of a specified area can be converted into the data transmission destination information (such as a work station name) that can be understood by the data transmission destination decision device 22b, so that the data destination can be specified only by specifying its corresponding area.

Also, due to the fact that one area has plural pieces of data transmission destination information, only by specifying the area, a plurality of data transmission destinations can be specified.

In FIG. 3, there is shown an example of a transfer destination management table 27 which manages the permission or prohibition of transfer of the respective pieces of application software of an application software group 25 by means of a transfer permission flag. In other words, the transfer destination management table 27 comprises application names and transfer permission flags respectively corresponding to the application names. Due to use of the transfer destination management table 27, the received data can be transferred to a plurality of transfer destinations.

Figure 5:
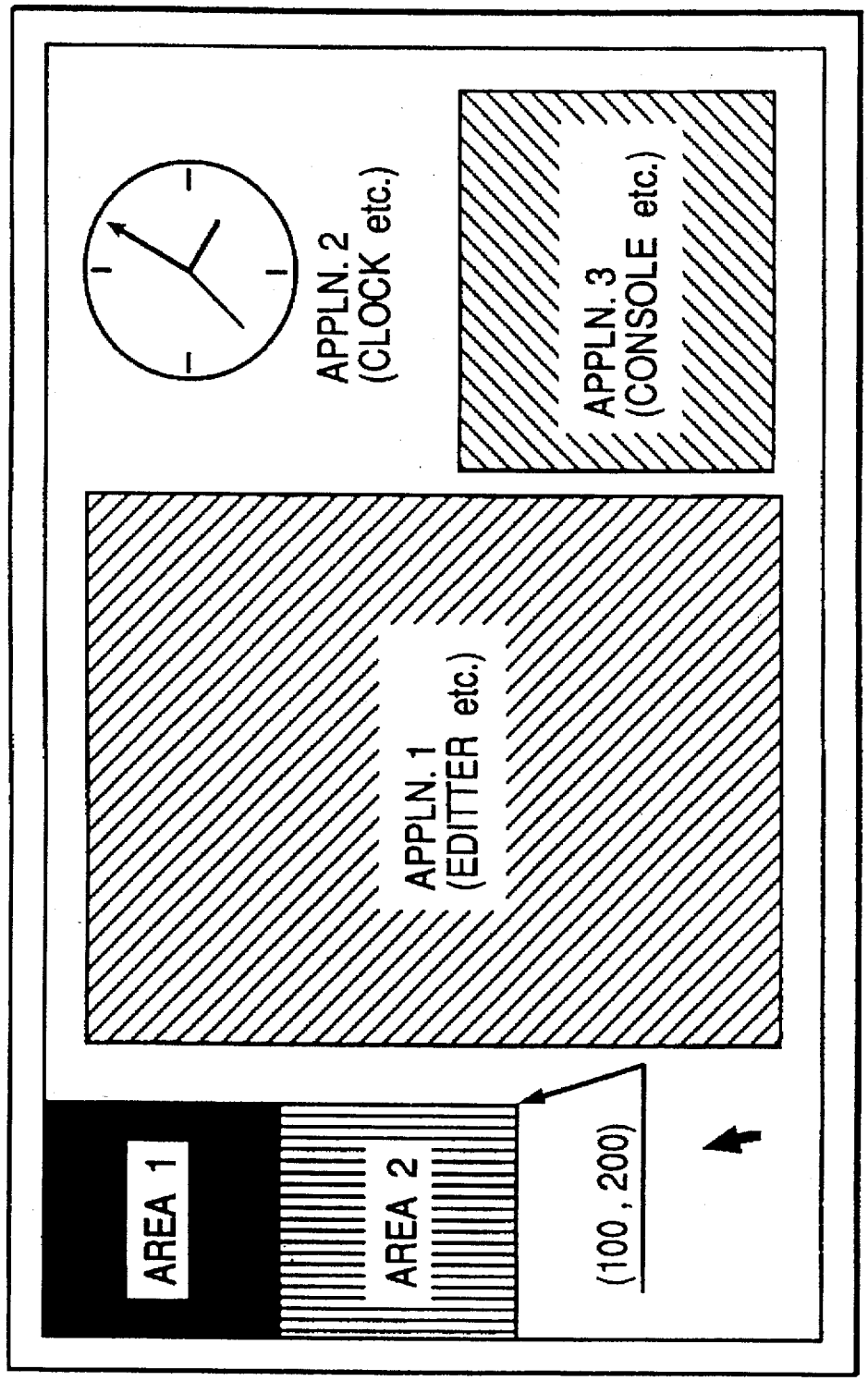
FIG. 5 is a schematic diagram illustrating an example of a CRT screen display employed in the illustrated embodiment according to the invention.

In FIG. 5, there is shown an example of a CRT screen display employed in the present embodiment.

Figure 6:
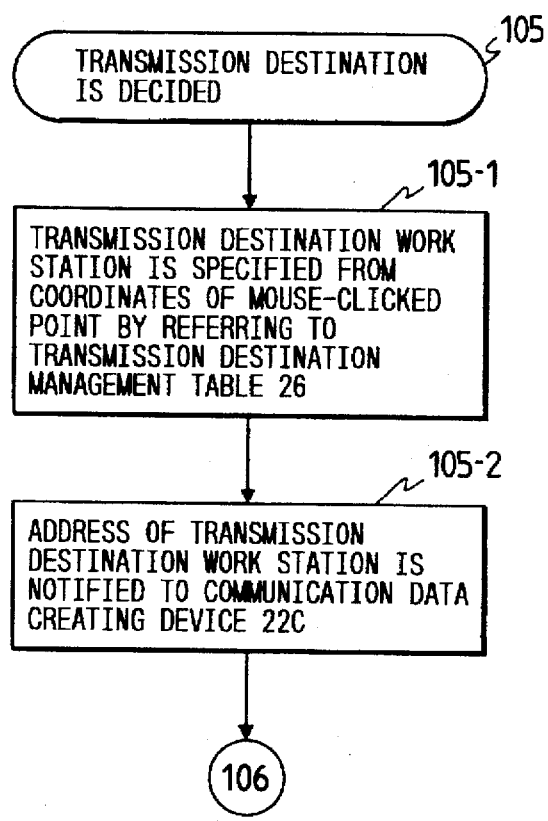
FIG. 6 is a flow chart for explaining an operation to decide a transmission destination according to the invention; and, FIG. 7 is a flow chart for explaining an operation to decide a transfer destination according to the invention.
Figure 7:
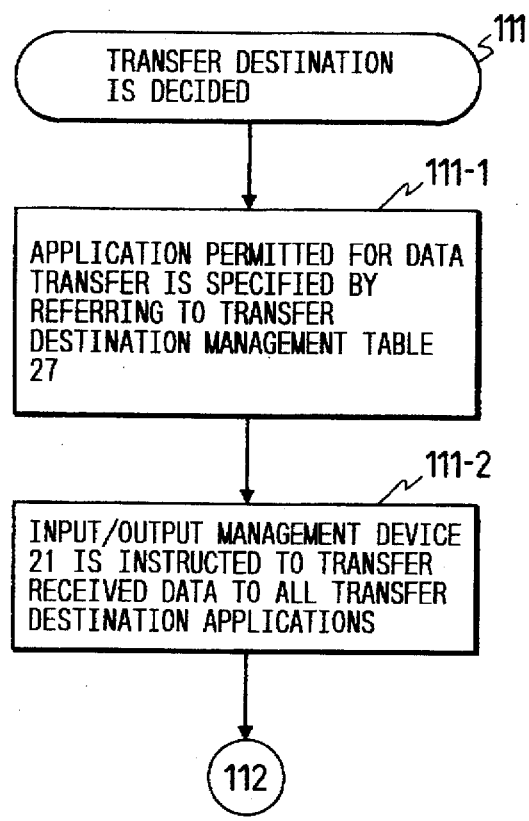

Assuming that the example shown in FIG. 2 is used as the transmission destination management table 26 and the example in FIG. 3 is used as the transfer destination management table 27, description will be given below of the operation of the transmission destination decision and the operation of the transfer destination decision with reference to flow charts respectively shown in FIGS. 6 and 7.

Figure 4:
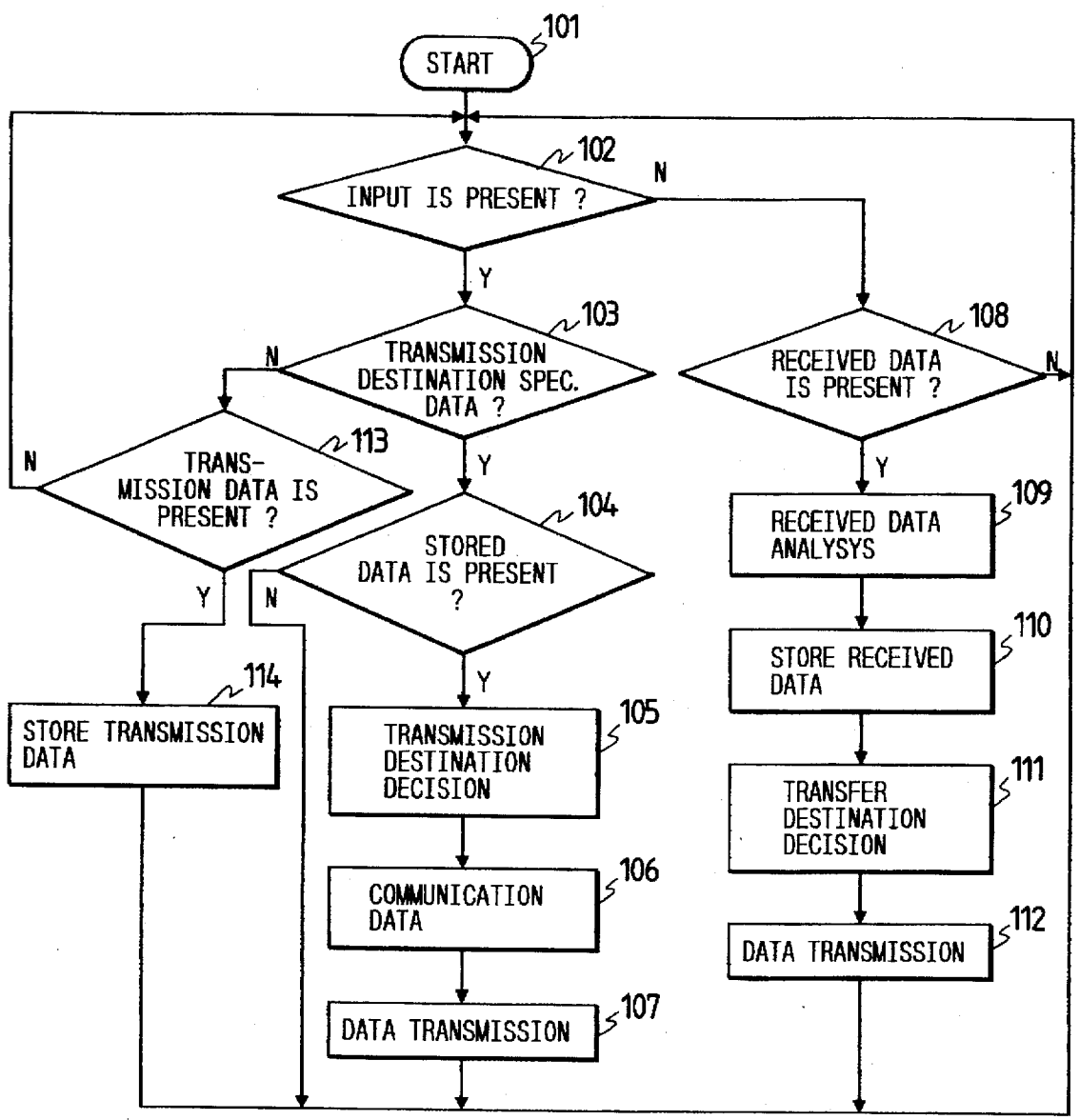
FIG. 4 is a flow chart for explaining the operation of a groupware system according to the invention.

If it is assumed here that an operator clicks a mouse at an arbitrary point within an area 2 in FIG. 5 in Step 102 in a flow chart shown in FIG. 4, then the data transmission destination decision device 22b decides (step 105) the transmission destination and refers to the transmission destination management table 26 to specify a work station 3 and a work station 4 as the transmission destinations from the coordinates of the point clicked by the mouse (Step 105-1), and then to inform the communication destination data creating device 22c of the respective addresses of these work stations (Step 105-2).

On the other hand, at the receiving side, once the transfer destination is decided (step 111), the data transfer destination decision device 24c refers to the transfer destination management table 27 to specify an application 1 and an application 3 as the transfer destinations (Step 111-1) and then to instruct the input/output management device 21 to the effect that the data is to be transferred to all applications (Step 111-2).

As has been described heretofore, according to the invention, due to the fact that simple data transmission destination information is used to specify a destination to be communicated between work stations, an operator is able to transmit and receive data between the work stations easily and freely.

Also, due to use of a transmission destination management table, a transmission destination can be changed with flexibility and data can be transmitted to a plurality of work stations only by a single operation.

Further, due to use of a transfer destination management table, data received can be displayed on a plurality of windows and can be transferred an arbitrary processing program with ease and flexibility.

What is claimed is:

1. A groupware system comprising:
    a plurality of data processing systems connected through a network to perform a cooperative operation with shared data;
    each of said data processing systems having:
        a memory for storing group software;
        input/output management means for managing a display output to an operator and an input from the operator;
    input/output management means for managing a display output to an operator and an input from the operator;
    communication control means for controlling a procedure for communication with other operative data processing systems connected to the network;

transmission data storage means for storing content data inputs from said input/output management means for transmission;

a transmission destination management table for determining an address for a transmission destination, said transmission destination management table storing relationship data on relationships between positions on said display output and pieces of address data of transmission destinations;

data transmission destination decision means referring to said transmission destination management table to find address information on the transmission destination based on a position said display output specified by the operator through said input/output management means;

communication data creation means creating first communication data from said transmission destination address information obtained by said data transmission destination decision means and the content data to be transmitted that is stored in said transmission data storage means and transmitting the first communication data to said communication control means for output to at least one of the other operative data processing systems;

communication data analysis means for analyzing second communication data input therein from said communication control means and for identifying and separating input content data and input address information of said input second communication data from each other;

communication data storage means for storing said content data of said second communication data identified and separated by said communication data analysis means;

a transfer destination management table for managing whether input content data can be transferred to respective pieces of application software in said group software memory in any one of said data processing systems; and data transfer destination decision means referring to said transfer destination management table according to said input address information identified and separated by said communication data analysis means to decide whether the input content data can be transferred to the application software stored in said group software memory.

2. The data processing apparatus as set forth in claim 1 wherein said input/output management means comprises a display means and a position specifying means and has a function to input a data transmission destination as position information by specifying a given area of said display means by said position specifying means.

3. The data processing apparatus as set forth in claim 1 wherein said transmission destination management table is a table which corresponds one bit of said transmission destination specification information to two or more bits of transmission destination address information, in order that a plurality of data transmission destinations can be specified simultaneously.

4. The data processing apparatus as set forth in claim 1 wherein said transfer destination management table sets transmission permission to two or more pieces of application software, so that a plurality of data transmission destinations can be specified simultaneously.

5. The data processing apparatus as set forth in claim 1 wherein said transmission destination management table comprises an erasable memory.

6. The data processing apparatus as set forth in claim 1 wherein said transfer destination management table comprises an erasable memory.

* * * * *